(12) United States Patent
Sasaki et al.

(10) Patent No.: US 6,393,223 B2
(45) Date of Patent: May 21, 2002

(54) PHOTO FILM TRANSPORTING DEVICE

(75) Inventors: Wataru Sasaki, Asaka; Tatsuo Saito, Omiya, both of (JP)

(73) Assignees: Fuji Photo Film Co., Ltd., Kanagawa; Fuji Photo Optical Co., Ltd., Saitama, both of (JP)

( * ) Notice: Subject to any disclaimer, the term of this patent is extended or adjusted under 35 U.S.C. 154(b) by 0 days.

(21) Appl. No.: 09/798,917

(22) Filed: Mar. 6, 2001

(30) Foreign Application Priority Data

Mar. 6, 2000 (JP) ........................................ 2000-061119

(51) Int. Cl.[7] ................................................. G03B 1/00

(52) U.S. Cl. ........................................ 396/395; 396/406

(58) Field of Search .............................. 396/301, 302, 396/387, 395, 400, 406, 398

(56) References Cited

U.S. PATENT DOCUMENTS 4,451,150 A * 5/1984 Maida ........................ 396/406

* cited by examiner

*Primary Examiner*—David M. Gray
*Assistant Examiner*—Rochelle Blackman
(74) *Attorney, Agent, or Firm*—Sughrue Mion, PLLC

(57) ABSTRACT

An electric current is supplied from a power source to a motor for transporting a film through a switching element (a transistor). A regenerate current is generated from the motor when the current supply is cut, and the regenerate current is returned to the motor through a switching element (a first MOS FET). The switching elements are turned on and off according to the state of a second MOS FET. When the second MOS FET is turned on, the transistor is turned on and the first MOS FET is turned off, and this drives the motor. When the second MOS FET is turned off, the transistor is turned off and the first MOS FET is turned on, and this stops the motor.

6 Claims, 9 Drawing Sheets

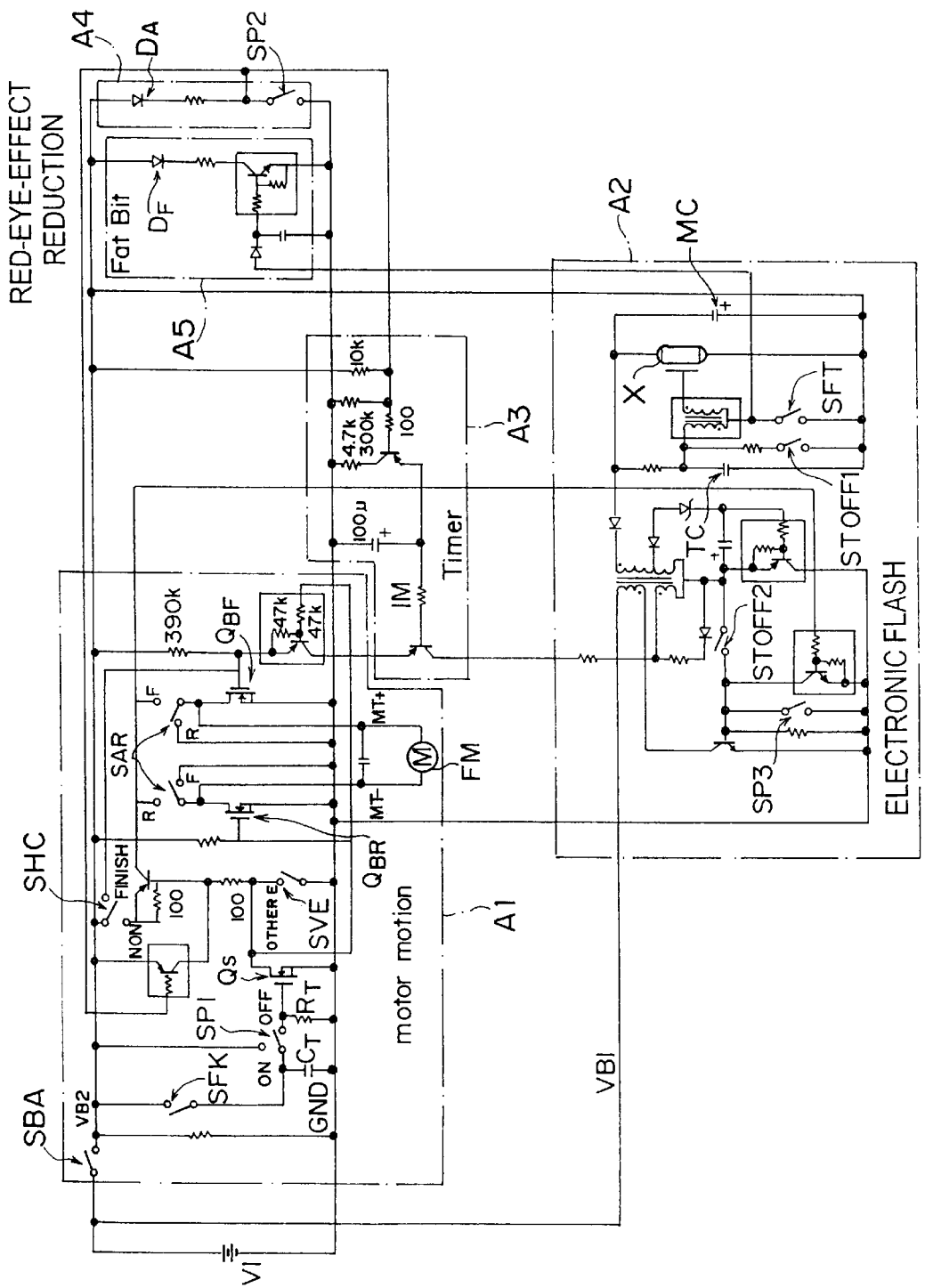
F I G. 2

F I G. 4
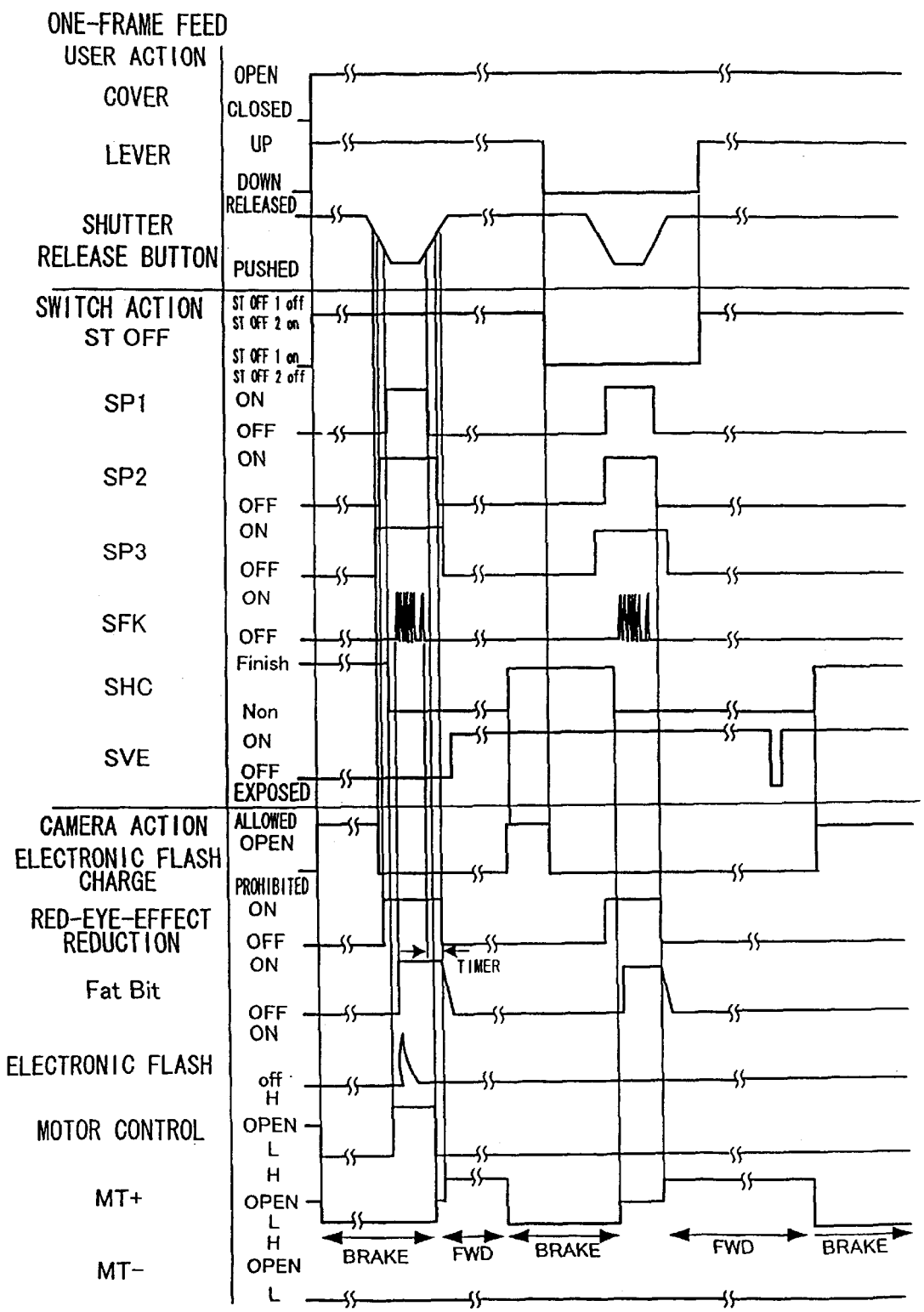

F I G. 7
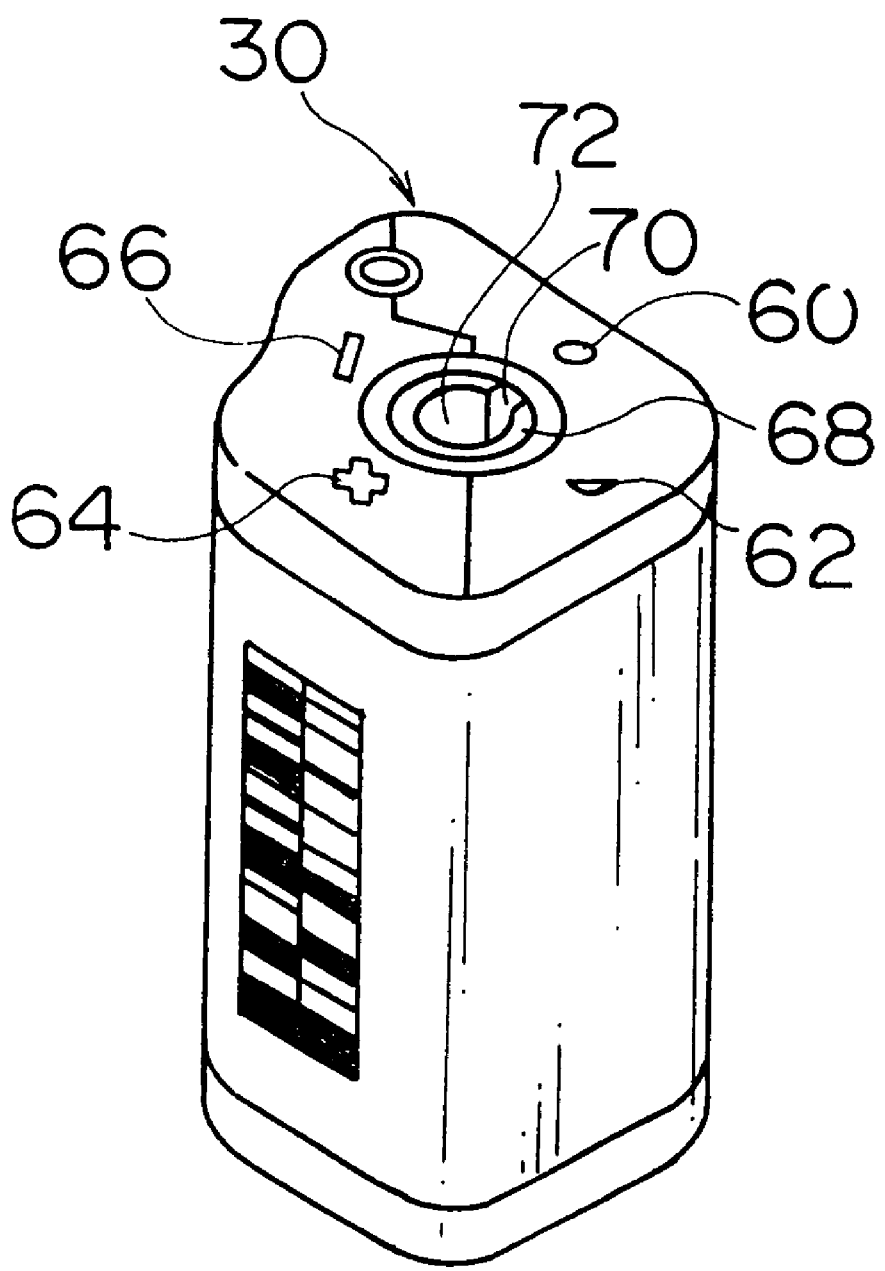

PHOTO FILM TRANSPORTING DEVICE

BACKGROUND OF THE INVENTION

1. Field of the Invention

The present invention relates generally to a photo film transporting device, and more particularly to a photo film transporting device applied to a camera using a photo film such as an APS film.

2. Description of Related Art

An advanced photo system (APS) camera using an APS film is widely known. The entire surface of the APS film is coated with a transparent magnetic recording layer for recording information. In addition, a cartridge of the APS film has a visual exposure index (VEI) indicating the state of the film. The VEI has a circular hole, a semicircular hole, an X-shaped hole and a rectangular hole formed in the bottom of the cartridge, and a white tongue that rotates with a spool is provided in the cartridge. The VEI stops the tongue at the circular hole, the semicircular hole, the X-shaped hole or the rectangular hole to show a white circle, semicircle, X or rectangle, respectively; and they indicate that the film has not been used, that it has been half exposed, that it has been completely exposed, and that it has been developed, respectively.

When the film is rewound into the cartridge after all the frames are exposed, the VEI needs to show the X indicating that the film has been exposed. The spool keeps rotating even after the film is completely rewound into the cartridge, and it needs to immediately stop when the white tongue comes to the X-shaped hole.

To control a motor for transporting the film, a photo film transporting device needs an electric current supply route from a power source to the motor, a loop that returns a regenerate current generated from the motor when the electric current supply route is cut in order to stop the motor, and so on. Also, the photo film transporting device needs a plurality of switching circuits that form and cut the electric current supply route and the loop, and circuits that turn on and off the switching circuits. This makes the photo film transporting device complicated and expensive.

SUMMARY OF THE INVENTION

In view of the foregoing, it is an object of the present invention to provide a simple and inexpensive photo film transporting device that drives and stops a motor for transporting a film.

To achieve the above-mentioned object, the present invention is directed to a photo film transporting device that drives a motor to transport a photo film, the photo film transporting device comprising: a first switching device that forms an electric current supply route for supplying an electric current from a power source to the motor when a voltage of a control terminal of the first switching device is a first voltage, the first switching device cutting the electric current supply route when the voltage of the control terminal of the first switching device is a second voltage; a second switching device that forms a loop for returning a regenerate current generated from the motor to the motor when the voltage of a control terminal of the second switching device is the second voltage, the second switching device cutting the loop when the voltage of the control terminal of the second switching device is the first voltage; and a voltage switching device that switches a voltage of a common terminal connected to the control terminals of the first switching device and the second switching device between the first voltage and the second voltage, wherein: the first switching device forms the electric current supply route and the second switching device cuts the loop to drive the motor when the voltage switching device sets the first voltage; and the first switching device cuts the electric current supply route and the second switching device forms the loop to stop the motor when the voltage switching device sets the second voltage.

The first switching device comprises a bipolar transistor, and the second switching device comprises a field-effect transistor.

The voltage switching device sets the first voltage when a high voltage is applied from a CR timer composed of a capacitor and a resistor to the voltage switching device; the voltage switching device sets the second voltage when a low voltage is applied from the CR timer to the voltage switching device; and an amount of driving time of the motor is controlled by stopping supplying electric charges to the capacitor.

The supply of the electric charges to the capacitor is started and stopped according to whether or not the film is at a predetermined position.

The voltage switching device comprises a field-effect transistor.

The photo film transporting device further comprises a contact connected to the common terminal, the voltage of the contact is switched between the first voltage and the second voltage according to a state of a Visual Exposure Index of a cartridge containing the film, wherein the voltage of the control terminals of the first and second switching devices is set to the first voltage when at least one of the contact and the voltage switching device sets the first voltage.

According to the photo film transporting device of the present invention, the voltage switching device switches the voltage of the common terminal connected to the control terminals of the first switching device and the second switching device between the first voltage (for example, the low voltage) and the second voltage (for example, the high voltage). When the voltage switching device sets the first voltage, the first switching device forms the electric current supply route and the second switching device cuts the loop, and this drives the motor. When the voltage switching device sets the second voltage, the first switching device cuts the electric current supply route and the second switching device forms the loop, and this stops the motor. Therefore, the motor can be driven and stopped with one voltage switching device, and this makes the circuit simple and less expensive.

If the second switching device is the FET, the control current for turning on the FET is not necessary, and this saves electricity.

If the voltage switching device is the FET, electricity can be saved. If the CR timer times the switching by the voltage switching device, the inexpensive element (for example, the ceramic capacitor) can be used, and this lowers the cost.

The contact that switches the voltage of the common terminal between the first voltage and the second voltage according to the state of the VEI is connected to the common terminal, and the voltage of the control terminals of the first and second switching devices is the first voltage when at least one of the contact and the voltage switching device sets the first voltage. Thus, the motor is driven when both of the contact and the voltage switching device do not set the second voltage. Therefore, when the voltage switching device sets the first voltage, the motor can be driven regardless of the state of the VEI; and when the voltage switching device sets the second voltage, the motor can be stopped according to the state of the VEI.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 2 is a circuit diagram showing the entire structure of the APS camera;

FIG. 4 is a timing charts showing timings of user actions, switch actions and camera actions at a one-frame shooting (one-frame feed);

FIG. 7 is a perspective view of the cartridge for explaining a VEI;

DETAILED DESCRIPTION OF THE PREFERRED EMBODIMENT

This invention will be described in further detail by way of example with reference to the accompanying drawings.

Figure 1:
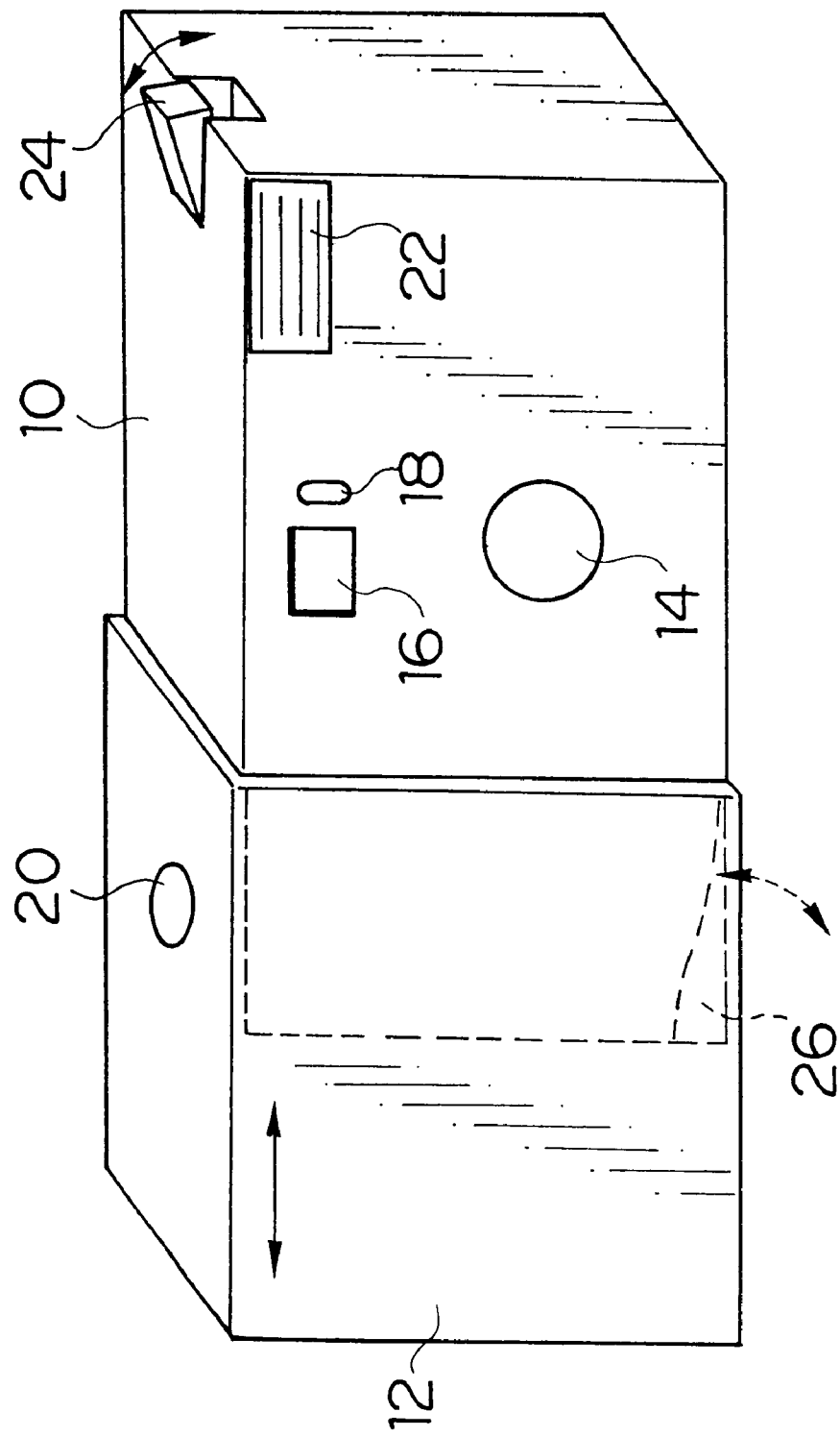
FIG. 1 is a perspective view showing the appearance of an APS camera to which the present invention is applied.

FIG. 1 is a perspective view showing the appearance of an APS camera to which the present invention is applied. A camera body 10 of the APS camera is provided with a cover 12. The cover 12 can be slid between a position for covering a taking lens 14 (closed position) and a position for revealing the taking lens 14 (open position) as shown in FIG. 1. When the cover 12 is slid from the closed position to the open position, the power is automatically turned on and the camera becomes ready for a shooting. The opening of the cover 12 also reveals a viewfinder 16 and a red-eye-effect reduction lamp 18.

A shutter release button 20 is provided on the top of the cover 12, and a shutter is released when the shutter release button 20 is pushed.

An electronic flash 22 is provided in the upper right corner of the front of the camera body 10. When a lever (electronic flash charge display lever) 24 provided on the top of the camera body 10 is pulled up, the electronic flash 22 becomes able to emit a light (electronic flash light-emitting mode). When the lever 24 is pushed down, the electronic flash 22 is prohibited from emitting the light.

A lid 26 is provided on the bottom of the camera body 10 as shown by a dotted line. When the lid 26 is open, an APS film cartridge can be put in or taken from a film cartridge chamber in the camera body 10.

Figure 3:
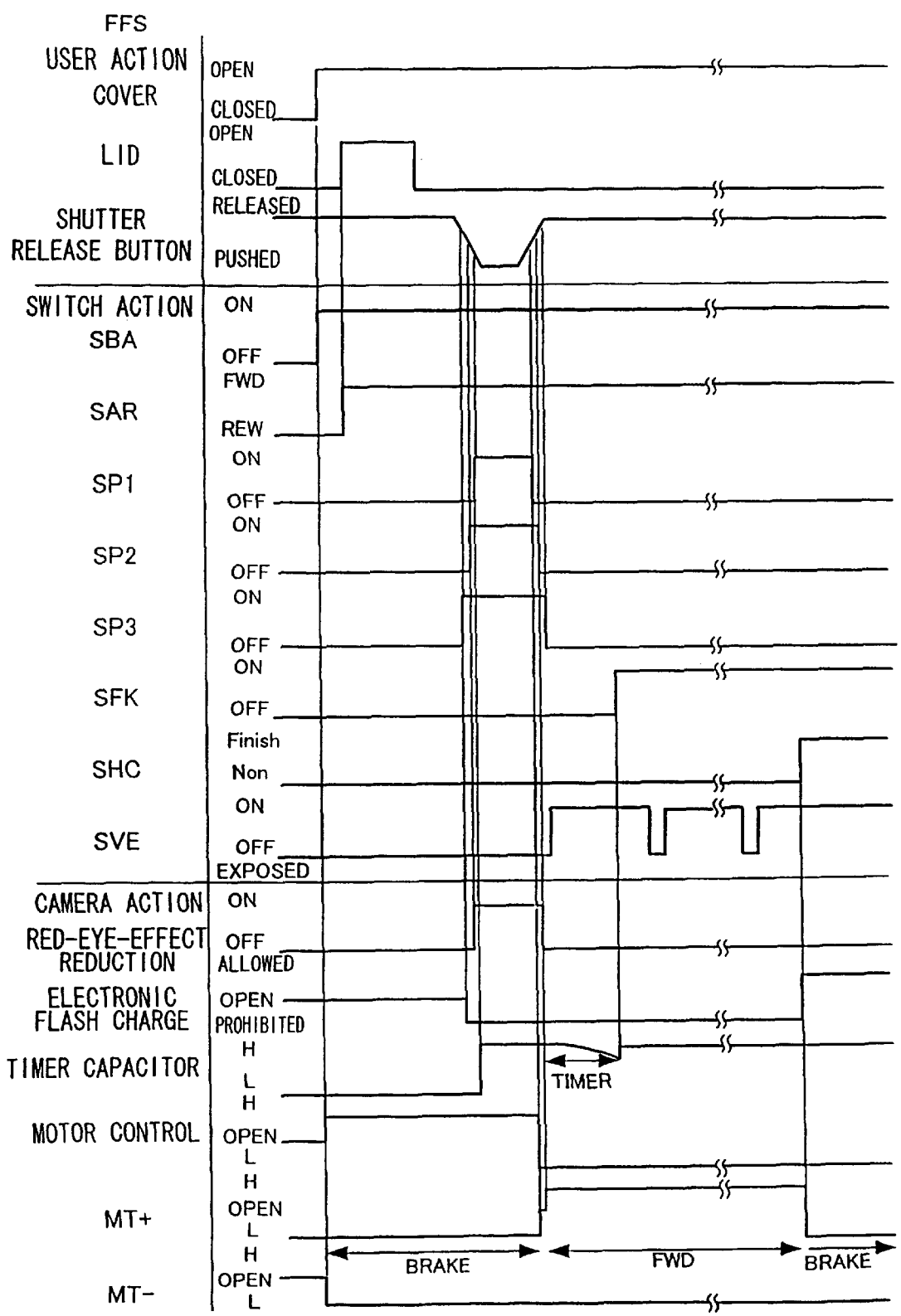
FIG. 3 is a timing charts showing timings of user actions, switch actions and camera actions at a first frame set (FFS) when a cartridge is put in a film cartridge chamber.
Figure 5:
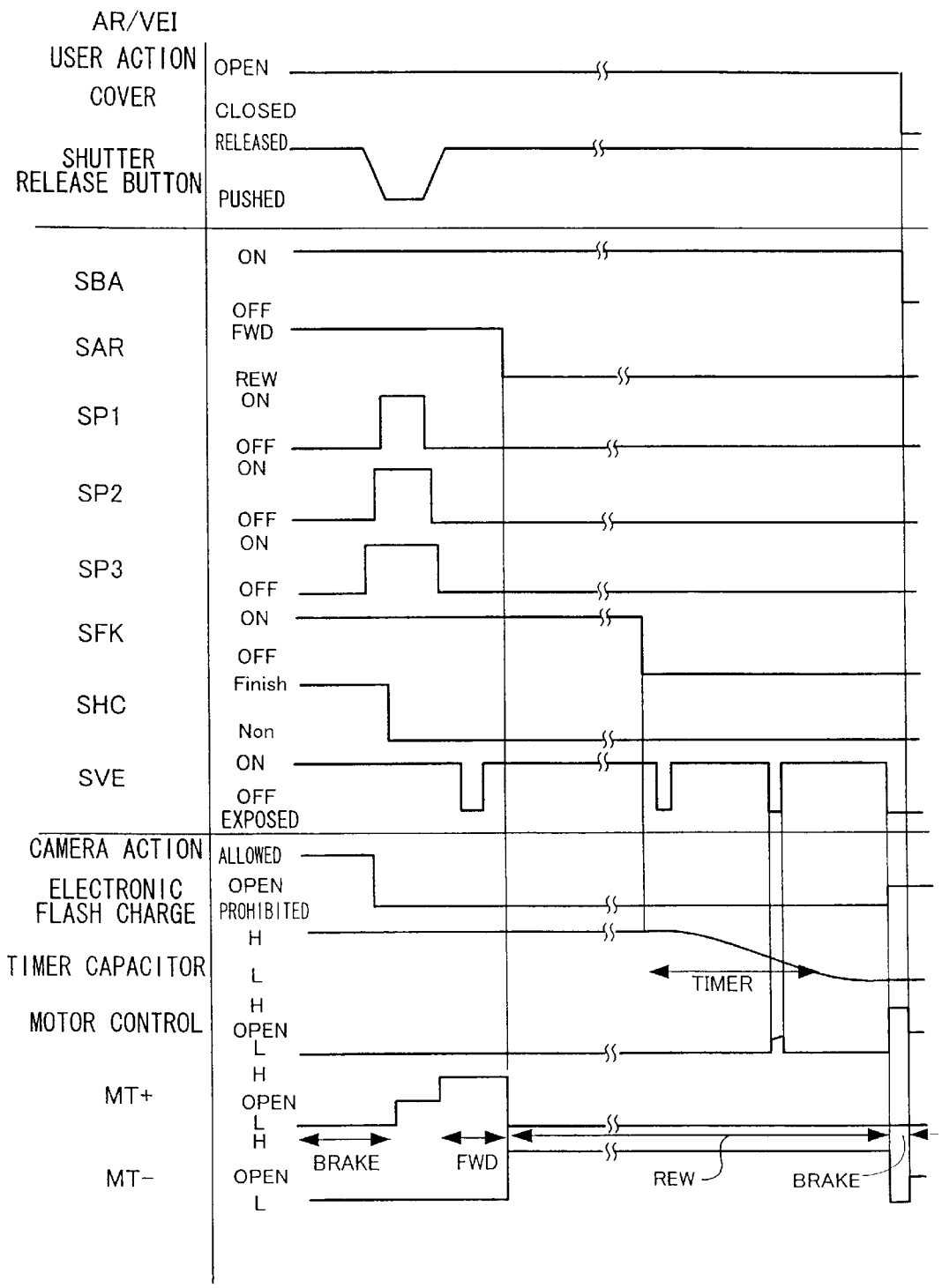
FIG. 5 is a timing charts showing timings of user actions, switch actions and camera actions at an automatic rewinding (AR/VEI) after all the frames are exposed.

FIG. 2 is a circuit diagram showing the entire structure of the APS camera, and FIGS. 3, 4 and 5 are timing charts showing timings of user actions, switch actions and camera actions. FIG. 3 shows the timings at the first frame set (FFS) when the cartridge is put in the film cartridge chamber, and FIG. 4 shows the timings at the one-frame shooting (one-frame feed), and FIG. 5 shows the timings at the automatic rewinding (AR/VEI) after all the frames are exposed.

The circuit in FIG. 2 has a motor FM for transporting the film, a xenon tube X for emitting the electronic flash light, a light emitting diode $D_A$ for reducing red-eye effect (the red-eye-effect reduction lamp 18 in FIG. 1), and a fat-bit light emitting diode $D_F$ for putting marks (fat bits) indicating print types (C, H and P). For driving and controlling them, the circuit is composed of a power source V1 (battery), a motor motion circuit A1, an electronic flash circuit A2, a timer circuit A3, a red-eye-effect reduction circuit A4 and a fat bit circuit A5.

The circuit has switches SBA, SAR, SP1, SP2, SP3, SFK, SHC, SVE, SFT, ST OFF1, and ST OFF2 that operate in response to the user action, the film transportation, and so on. The film transportation, the charge and the light-emission of the electronic flash, the light-emission of the light emitting diode $D_A$, the light-emission of the fat-bit light emitting diode $D_F$, etc. are timed by the switches.

In the camera actions in FIGS. 3, 4 and 5, the electronic flash charge is the charge of a main capacitor MC in FIG. 2, and the timer capacitor is a capacitor $C_T$ (the capacitor $C_T$ and a resistor $R_T$ compose a CR timer), and the motor control shows the drain voltage of a MOS FET $Q_s$ in FIG. 2. MT+ and MT− are the positive terminal and the negative terminal, respectively, when the motor FM is rotated in a forwarding direction.

Switching timings of the switches in FIG. 2 and the operation thereof will now be explained.

The switch SBA is turned on and off in response to the opening and closing of the cover 12 in FIG. 1. The switch SBA is turned on when the cover 12 is opened (see FIG. 3), and it is turned off when the cover 12 is closed (see FIG. 5). The turning on the switch SBA supplies power from the battery V1 to the circuits A1–A5. A power switch may be provided to turn on and off the switch SBA regardless of the opening and closing of the cover 12.

In the switch SAR, movable contacts are moved between fixed contacts F and R in response to the opening and closing of the lid 26 and the detection of the trailing end of the film after the exposures of all the frames. When the user opens the lid 26, the movable contacts are connected to the fixed contacts F to set the forwarding direction (FWD) in which the film is transported out of the cartridge as the rotating direction of the motor FM (see FIG. 3). When the trailing end of the film is detected after the exposures of all the frames, the movable contacts are connected to the fixed contacts R to set a rewinding direction (REW) in which the film is transported into the cartridge as the rotating direction of the motor FM (see FIG. 5). Thus, when the user opens the lid 26, puts the cartridge and closes the lid 26, the forwarding direction is set as for the rotating direction of the motor FM. When the shutter release button 20 is pressed after that, the motor FM is driven in the forwarding direction and the first frame set (FFS) is performed (see FIG. 3). When the trailing end of the film is detected after the exposure of the last frame, the motor FM automatically starts to be driven in the rewinding direction to rewind the film.

The switches SP1, SP2 and SP3 are turned on and off in response to the state of the shutter release button 20 in FIG. 1. While the shutter release button 20 is fully pressed, the switches SP3, SP2 and SP1 are turned on in this order. While the shutter release button 20 is released, the switches SP1, SP2 and SP3 are turned off in this order.

When the switch SP1 is turned on, the charge of the capacitor $C_T$ (the timer capacitor) of the CR timer is started; and when the switch SP1 is turned off, the CR timer is started (see FIG. 3). When the switch SP2 is turned on, the light emission of the light emitting diode $D_A$ is started; and when the switch SP2 is turned off, the light emission is stopped. When the switch SP2 is turned on, the feed of the film by the motor FM is prohibited; and when the switch SP2 is turned off, the feed is started. In addition, when the switch SP2 is turned on, the resetting processing for the timer circuit A3 that times the charge of the main capacitor MC is started; and when the switch SP2 is turned off, the resetting processing is stopped (see FIG. 4). When the switch SP3 is turned on, the charge of the main capacitor MC is prohibited; and when the switch SP3 is turned off, the charge is allowed (see FIG. 4).

Figure 6:
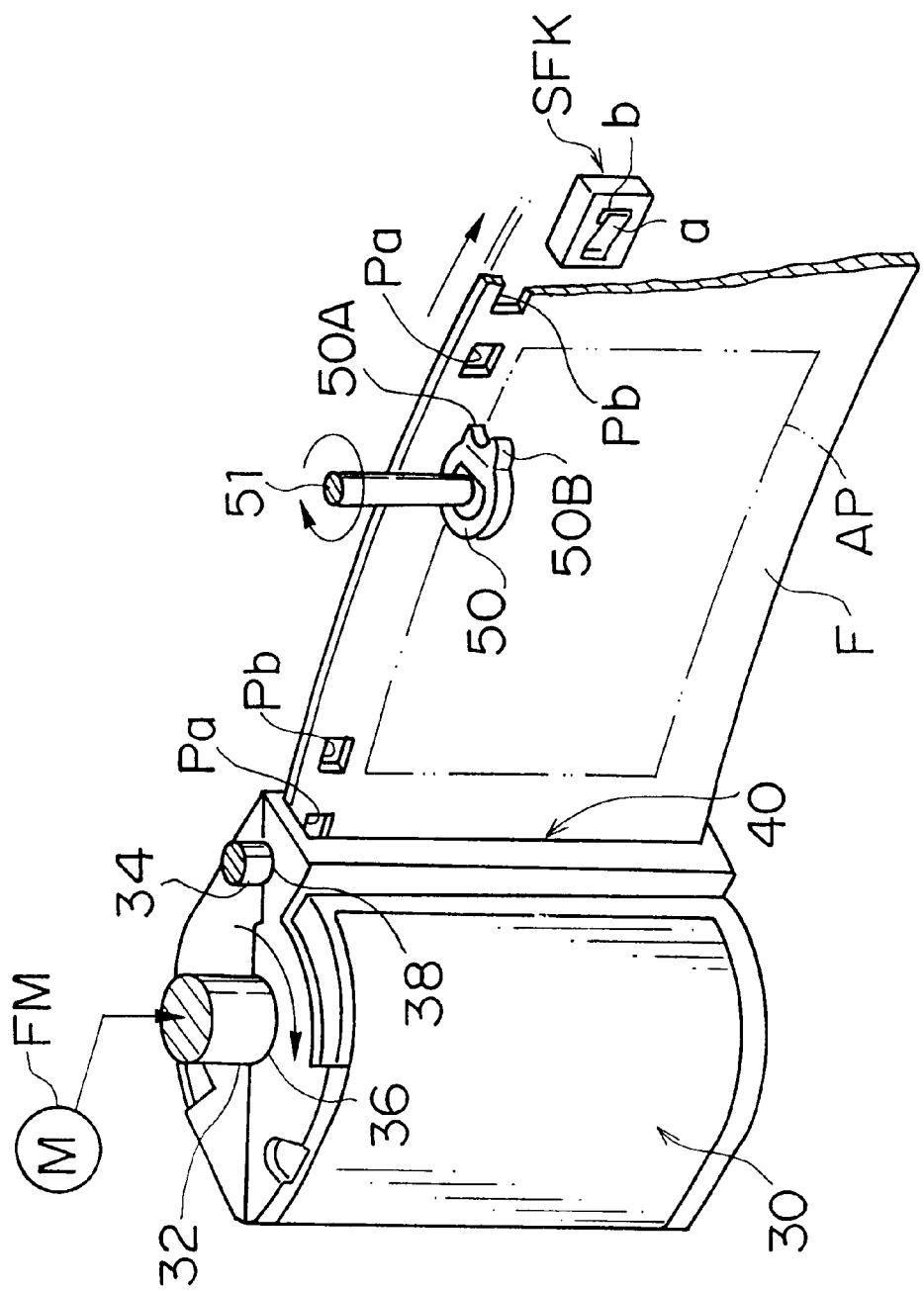
FIG. 6 is a perspective view of a film transporting route showing switches SFK and SHC.

The switch SFK is turned on and off according to whether the film is on a transporting route, and FIG. 6 shows the switch SFK. In FIG. 6, the film F is pulled out of the cartridge 30 in the cartridge chamber to the transporting route. Driving shafts 32 and 34 are projected into the cartridge chamber and driven by the motor FM. When the cartridge 30 is put in the cartridge chamber, the driving shafts 32 and 34 are coupled with a hole 36 in a spool and a hole 38 for opening and closing a light-shielding lid of an opening 40, respectively. Rotation of the driving shaft 34 opens the light-shielding lid, and rotation of the driving shaft 32 rotates the spool to feed the film F to the transporting route through the opening 40. The film F passes an aperture area AP to be exposed, and then it is wound on a take-up spool (not shown). The switch SFK is arranged at a position where the film F passed after the aperture area AP. When the film F is not at the position of the switch SFK, two contacts a and b of the switch SFK are not in contact with each other; and when the film F is at the position, the two contacts a and b are in contact with each other. Thus, at the FFS explained in FIG. 3, when the leading end comes to the position of the switch SFK, the switch SFK is turned on. At the automatic rewinding (AR/VEI) explained in FIG. 5, when the leading end of the film F comes to the position of the switch SFK, the switch SFK is turned off.

As shown in FIG. 3, if the switch SFK is turned on at the FFS, the motor FM rotates in the forwarding direction until the end of the FFS even after the CR timer is up. If the film F is not fed properly, the stop of the driving of the motor FM becomes effective when the CR timer is up. The switch SVE actually stops the motor FM after the stop of the driving becomes effective.

When the switch SFK is turned off at the AR, the stop of the driving of the motor FM in the rewinding direction becomes effective after the CR timer is up (after the leading end of the film F is stored in the cartridge 39). The switch SVE actually stops the motor FM after the stop of the driving becomes effective.

In the switch SHC, a movable contact is moved between the a fixed contact FINISH and a fixed contact NON in response to detection of perforations formed in the film F and the operation of the shutter release button 20 (the opening of the shutter). FIG. 6 shows how the perforations are detected. As shown in FIG. 6, perforations Pa and Pb are formed at the front end and the back end of each frame in the film F, respectively. A sprocket 50 with two teeth 50A and 50B is fixed to a rotatable shaft 51 so that the teeth 50A and 50B are coupled with two adjoining perforations Pa and Pb (a perforation Pb at the back end of a frame and a perforation Pa at the front end of the next frame). While the film F is transported, the sprocket 50 rotates with the shaft 51. The teeth 50A and 50B are coupled with the perforations Pa and Pb, and the periphery (excluding the teeth 50A and 50B) of the sprocket 50 are in contact with the parts between the perforations Pa and Pb. When the teeth 50A and 50B are coupled with the perforations Pa and Pb and the shaft 51 is in the middle of the two adjoining perforations Pa and Pb, the frame with the perforation Pa is at the aperture area AP. The shutter charge is finished at this time during the FFS or the one-frame feed.

The switch SHC operates in response to the rotation of the shaft 51. When the shutter charge is finished, the movable contact is connected to the fixed contact FINISH in FIG. 2. Then, when the shutter release button 20 is fully pressed, the movable contact is connected to the fixed contact NON.

During the FFS or the one-frame feed, if the FFS or the shutter charge is finished and the movable contact is connected to the fixed contact FINISH when the motor FM is driven in the forwarding direction, the power supply to the motor FM is cut, and a MOS FET $Q_{BF}$ in FIG. 2 is turned on to form a loop for returning a regenerate current generated from the motor FM to the motor FM. This brakes and stops the motor FM. If the movable contact is connected to the fixed contact FINISH when the electronic flash charge display lever 24 is up, the main capacitor MC starts to charge, and the timer circuit A3 that times the charge is started.

When the shutter release button 20 is pressed and the movable contact is connected to the fixed contact NON, the power is supplied from the power source V1 to the motor FM. When the switch SP2 is turned off in response to the state of the shutter release button 20, the motor FM is actually driven in the forwarding direction for the next shutter charge.

The switch SVE is turned on and off according to the state of the visual exposure index (VEI). Only when the VEI shows an X indicating that the film has been completely exposed, the switch SVE is off.

The VEI will now be explained. As shown in FIG. 7, a circular hole 60, a semicircular hole 62, an X-shaped hole 64 and a rectangular hole 66 are formed in the bottom of the cartridge 30, and a white tongue that rotates with the spool 68 is provided in the cartridge 30. The VEI stops the tongue at the circular hole 60, the semicircular hole 62, the X-shaped hole 64 or the rectangular hole 66 to show a white circle, semicircle, X or rectangle, respectively; and they indicate that the film F has not been used, that it has been half exposed, that it has been completely exposed, and that it has been developed, respectively. A hole 72 with a key groove 70 is formed in the spool 68 of the cartridge 30, and the position of the white tongue (the state of the VEI) can be determined from the position of the key groove 70.

Figure 8:
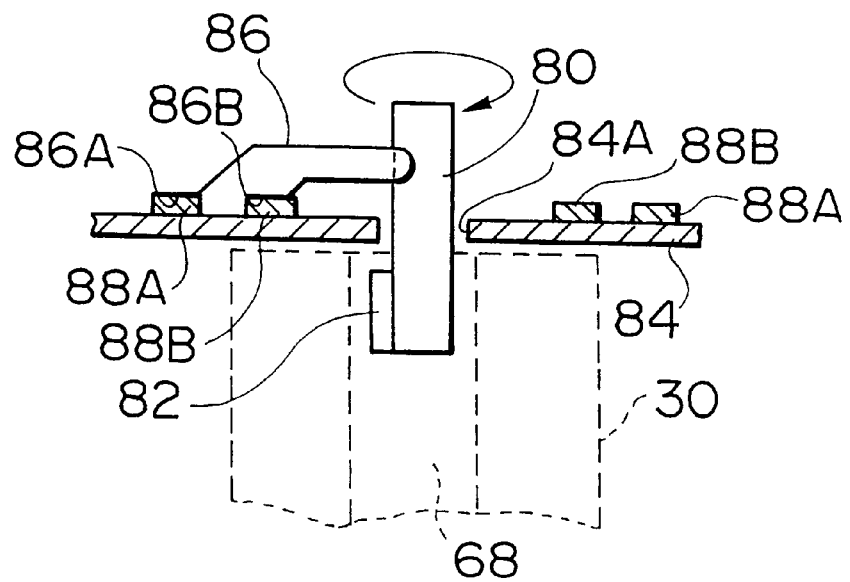
FIGS. 8(A) and 8(B) are explanatory diagrams showing a switch VEI.
Figure 8:
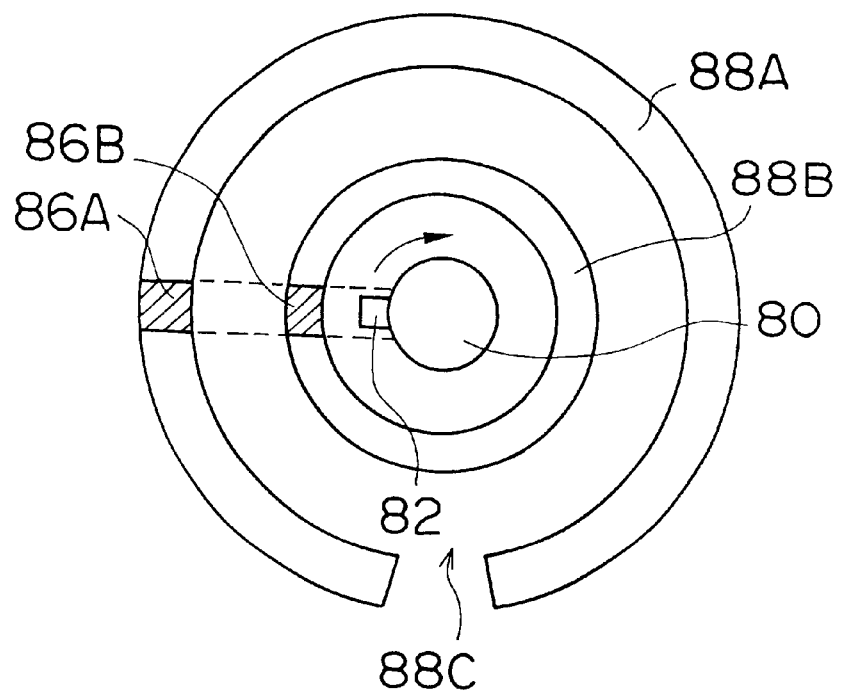

The mechanism for determining the state of the VEI will now be explained. As shown in FIG. 8(A), a rotatable shaft 80 is projected into the film cartridge chamber through a hole 84A in a chamber wall 84 to couple with the hole 72 in the spool 68 (the rotatable shaft 80 may be the driving shaft 32 coupled with the hole 36 in the top of the cartridge 30 in FIG. 6). A key 82 is formed on the rotatable shaft 80. When the cartridge 30 is put in the film cartridge chamber, the key 82 of the rotatable shaft 80 is coupled with the key groove 70 of the spool 68 so that the rotatable shaft 80 is coupled with the spool 68.

A conductor 86 with two contacts 86A and 86B is fixed to the rotatable shaft 80, and the contact 86A is farther from the rotatable shaft 80 than the contact 86B. Loop-shaped electrodes 88A and 88B are fixed to the outer surface of the chamber wall 84 as shown in FIG. 8(B). When the rotatable shaft 80 rotates with the spool 68 of the cartridge 30, the contacts 86A and 86B are in contact with the electrodes 88A and 88B, respectively, to short-circuit the electrodes 88A and 88B. A part of the electrode 88A is broken to form an insulator 88C. When the contact 86A comes to the insulator 88C, the electrodes 88A and 88B are not short-circuited. At this time, the VEI of the cartridge 30 shows the X indicating that the film has been exposed. When the VEI of the cartridge 30 shows the other marks, the electrodes 88A and 88B are short-circuited.

The switch SVE has the electrodes 88A and 88B, and it is turned off only when the VEI shows the X indicating that the film has been exposed. During the FFS or the AR/VEI, if the SVE is turned off when the switch SFK is off and the motor FM can be stopped since the CR timer has been up, the power supply to the motor FM is cut, and the MOS FET $Q_{BF}$ or a MOS FET $Q_{BR}$ is turned on, and the motor FM is braked and stopped.

The switches ST OFF (ST OFF1 and ST OFF2) are turned on and off in response to the operation of the electronic flash charge display lever 24. When the user pulls up the lever 24, the switch ST OFF1 is turned off and the switch ST OFF2 is turned on; and when the user pushes down the lever 24, the switch ST OFF1 is turned on and the switch ST OFF2 is turned off (see FIG. 4).

When the user pulls up the lever 24, the charge of the main capacitor MC for the electronic flash and the charge of a trigger capacitor TC are allowed (see FIG. 4). The charges are started when the movable contact is connected to the fixed contact FINISH in the switch SHC. When the user pushes down the lever 24, the charges of the main capacitor MC and the trigger capacitor TC are prohibited (see FIG. 4).

A switch SFT is turned on and off in response to the operation of the shutter release button 20. When the user fully presses the shutter release button 20, the shutter is released and the switch SFT is repeatedly turned on and off (see FIG. 4). Thus, when the switch SFT is turned on while the lever 24 is up, a trigger is applied from the trigger capacitor TC to the xenon tube X, and the electric charges stored in the main capacitor MC are discharged to the xenon tube X so that the electronic flash emits the light. Also, the light emitting diode $D_F$ for the fat bits emits the light.

Figure 9:
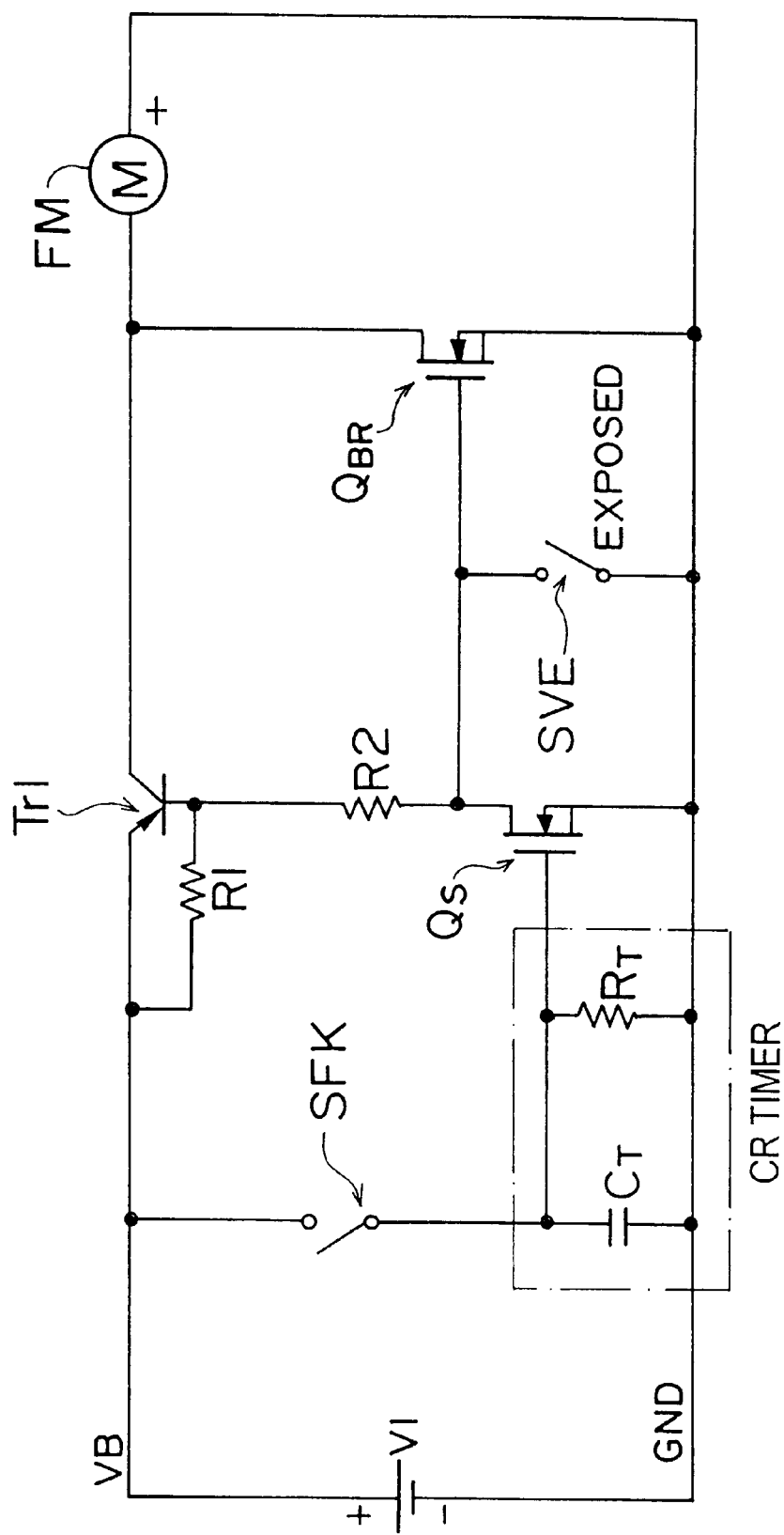
FIG. 9 is a simplified circuit diagram of FIG. 2 for explaining only the elements needed for film transportation during the AR/VEI.

The film transportation by the motor motion circuit A1 in FIG. 2 during the AR/VEI will now be explained. FIG. 9 shows a simplified circuit of the motor motion circuit A1 in FIG. 2, and it includes only the elements needed for the film transportation during the AR/VEI. The movable contacts are connected to the fixed contacts R in the switch SAR in FIG. 2 and the motor FM is driven in the rewinding direction during the AR/VEI, and FIG. 9 shows the state without showing the switch SAR. In addition, the movable contact is connected to the fixed contact OFF in the switch SP1 and the movable contact is connected to the fixed contact NON in the switch SHC, and FIG. 9 shows the states without showing the switches SP1 and SHC. Some elements that do not need to be explained are also omitted.

When the film is being rewound, the switch SFK in FIG. 9 is on until the leading end of the film comes to the predetermined position (see FIG. 6), and it is turned off at that time.

First, the operation of the circuit while the switch SFK is on (from the time when the movable contacts are connected to the fixed contacts R in the switch SAR until the switch SFK is turned off) will now be explained. When the switch SFK is on, the voltage is applied from the power source V1 to the gate of the MOS FET $Q_S$ to turn on the MOS FET $Q_S$ (a current flows between the drain and the source). The MOS FET $Q_S$ is an N-channel enhancement-mode MOS FET, and so is the MOS FET $Q_{BR}$. When the MOS FET $Q_S$ is on, a current flows through resistors R1 and R2 and a transistor Tr1 is turned on (a current flows between the emitter and the collector) whether the switch SVE is on or off. The transistor Tr1 is a PNP bipolar transistor, and the switch SVE is turned on and off according to the state of the VEI of the cartridge as stated above.

The current flows from the power source V1 to the motor FM through the transistor Tr1, and the motor FM rotates in the rewinding direction. This rewinds the film on the spool of the cartridge. At this time, since the drain voltage of the MOS FET $Q_S$ (the motor control in FIG. 5) is low (L), the gate voltage of the MOS FET $Q_{BR}$ is low and the MOS FET $Q_{BR}$ is off (a current does not flow between the drain and the source).

The operation of the circuit when the switch SFK is off (after the switch SFK is turned off) will now be explained. When the leading end of the film comes to the predetermined position, the switch SFK is turned off and the voltage is not applied from the power source V1 to the gate of the MOS FET $Q_S$. The capacitor $C_T$ of the CR timer has the electric charges that were stored when the switch SFK was on, and thus the voltage is applied to the gate of the MOS FET $Q_S$ until the CR timer is up. While the CR timer is working, the motor FM rotates in the rewinding direction to continue to rewind the film. The CR timer is set for at least the time needed to completely rewind the film into the cartridge. Since the MOS FET $Q_S$ is used as a switching element, the capacitance of the capacitor $C_T$ can be small, and thus an inexpensive ceramic capacitor or the like may be used as the capacitor $C_T$.

When the CR timer is up (after the film is completely rewound into the cartridge), the voltage is not applied to the gate of the MOS FET $Q_S$ to turn off the MOS FET $Q_S$. Therefore, the transistor Tr1 and the MOS FET $Q_S$ are turned on and off according to the state of the switch SVE.

If the VEI of the cartridge shows a mark other than the X, the switch SVE is on, and the transistor Tr1 is on and the MOS FET $Q_S$ is off. Thus, the motor FM rotates in the rewinding direction. If the VEI starts to show the X, the switch SVE is off. In this case, the current does not flow through the resistors R1 and R2 and the transistor Tr1 is turned off to cut the power supply to the motor FM. At the same time, the gate voltage of the MOS FET $Q_{BR}$ becomes high (H) to turn on the MOS FET $Q_{BR}$. This forms the loop for the regenerate current to brake and immediately stop the motor FM. Therefore, the motor FM stops to finish the rewinding of the film when the VEI shows the X.

After that, the cartridge is taken out of the camera. The VEI shows the X indicating that the film has been exposed.

In the embodiment, the transistor Tr1 is a switching element that forms the electric current supply route for supplying the electric current from the power source V1 to the motor FM and cuts the electric current supply route. The MOS FET $Q_{BR}$ is a switching element that forms the loop for returning the regenerate current generated from the motor FM to the motor FM and cuts the loop. The MOS FET $Q_S$ is a switching element that switches the base voltage of the transistor Tr1 and the gate voltage of the MOS FET $Q_{BR}$ between the high voltage (H) and the low voltage (L) to drive and stop the motor FM. These switching elements may be other kinds of bipolar transistors or FETs (junction FETs). In addition, the MOS FET $Q_{BR}$ may be a P-channel enhancement-mode MOS FET, and the transistor Tr1 may be an NPN bipolar transistor, and the anode and the cathode of the power source V1 may be inverted. In this case, the circuit can operate in the same way as that in FIG. 9. Also, a microcomputer may determine whether the switch SFK is on or off, and the high voltage or the low voltage may be applied to the base of the transistor Tr1 and the gate of the MOS FET $Q_{BR}$ from a port or the microcomputer instead of the MOS FET $Q_S$.

The photo film transporting device is applied to the camera in the embodiment, but it may be applied to a printer or the like.

In addition, it may be applied to a camera other than the APS camera. In this case, ignore the explanation for the VEI.

According to the photo film transporting device of the present invention, the voltage switching device switches the voltage of the common terminal connected to the control terminals of the first switching device and the second switching device between the first voltage (for example, the low voltage) and the second voltage (for example, the high voltage). When the voltage switching device sets the first voltage, the first switching device forms the electric current supply route and the second switching device cuts the loop, and this drives the motor. When the voltage switching device sets the second voltage, the first switching device cuts the electric current supply route and the second switching device forms the loop, and this stops the motor. Therefore, the motor can be driven and stopped with one voltage switching device, and this makes the circuit simple and less expensive.

If the second switching device is the FET, the control current for turning on the FET is not necessary, and this saves electricity.

If the voltage switching device is the FET, electricity can be saved. If the CR timer times the switching by the voltage switching device, the inexpensive element (for example, the ceramic capacitor) can be used, and this lowers the cost.

The contact that switches the voltage of the common terminal between the first voltage and the second voltage according to the state of the VEI is connected to the common terminal, and the voltage of the control terminals of the first and second switching devices is the first voltage when at least one of the contact and the voltage switching device sets the first voltage. Thus, the motor is driven when both of the contact and the voltage switching device do not set the second voltage. Therefore, when the voltage switching device sets the first voltage, the motor can be driven regardless of the state of the VEI; and when the voltage switching device sets the second voltage, the motor can be stopped according to the state of the VEI.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A photo film transporting device that drives a motor to transport a photo film, the photo film transporting device comprising:

a first switching device including only a single transistor, the first switching device forming an electric current supply route for supplying an electric current from a power source to the motor when a voltage of a control terminal of the first switching device is a first voltage, the first switching device cutting the electric current supply route when the voltage of the control terminal of the first switching device is a second voltage;

a second switching device including only a single field-effect transistor, the second switching device forming a loop for returning a regenerate current generated from the motor to the motor when the voltage of a control terminal of the second switching device is the second voltage, the second switching device cutting the loop when the voltage of the control terminal of the second switching device is the first voltage;

a voltage switching device that switches a voltage of a common terminal connected to the control terminals of the first switching device and the second switching device between the first voltage and the second voltage, wherein the first switching device forms the electric current supply route and the second switching device cuts the loop to drive the motor when the voltage switching device sets the first voltage, and the first switching device cuts the electric current supply route and the second switching device forms the loop to stop the motor when the voltage switching device sets the second voltage.

2. The photo film transporting device as defined in claim 1, wherein the voltage switching device comprises a field-effect transistor.

3. The photo film transporting device as defined in claim 1, wherein:

the voltage switching device sets the first voltage when a high voltage is applied from a CR timer composed of a capacitor and a resistor to the voltage switching device;

the voltage switching device sets the second voltage when a low voltage is applied from the CR timer to the voltage switching device; and an amount of driving time of the motor is controlled by stopping supplying electric charges to the capacitor.

4. The photo film transporting device as defined in claim 3, wherein the supply of the electric charges to the capacitor is started and stopped according to whether or not the film is at a predetermined position.

5. The photo film transporting device as defined in claim 3, wherein the voltage switching device comprises a field-effect transistor.

6. A photo film transporting device that drives a motor to transport a photo film, the photo film transporting device comprising:

a first switching device that forms an electric current supply route for supplying an electric current from a power source to the motor when a voltage of a control terminal of the first switching device is a first voltage, the first switching device cutting the electric current supply route when the voltage of the control terminal of the first switching device is a second voltage;

a second switching device that forms a loop for returning a regenerate current generated from the motor to the motor when the voltage of a control terminal of the second switching device is the second voltage, the second switching device cutting the loop when the voltage of the control terminal of the second switching device is the first voltage;

a voltage switching device that switches a voltage of a common terminal connected to the control terminals of the first switching device and the second switching device between the first voltage and the second voltage, wherein the first switching device forms the electric current supply route and the second switching device cuts the loop to drive the motor when the voltage switching device sets the first voltage, and the first switching device cuts the electric current supply route and the second switching device forms the loop to stop the motor when the voltage switching device sets the second voltage; and a contact connected to the common terminal, the voltage of the contact is switched between the first voltage and the second voltage according to a state of a Visual Exposure Index of a cartridge containing the film, wherein the voltage of the control terminals of the first and second switching devices is set to the first voltage when at least one of the contact and the voltage switching device sets the first voltage.

* * * * *